United States Patent [19]

Robinson

[11] 3,900,425

[45] Aug. 19, 1975

[54] CATALYST FOR OXIDATION OF HYDROCARBONS AND METHOD OF MAKING SAME

[75] Inventor: Eric Robinson, Lambeg, Northern Ireland

[73] Assignee: Lambeg Industrial Research Association, Lisburn, Northern Ireland

[22] Filed: May 2, 1973

[21] Appl. No.: 356,490

Related U.S. Application Data

[63] Continuation-in-part of Ser. No. 235,388, March 16, 1972, which is a continuation-in-part of Ser. No. 3,190, Jan. 15, 1970, abandoned.

[52] U.S. Cl. .................. 252/430; 260/687; 252/431
[51] Int. Cl. ..... B01j 11/06; B01j 11/08; B01j 11/22
[58] Field of Search ...................................... 252/430

[56] References Cited

UNITED STATES PATENTS

| | | | |
|---|---|---|---|
| 2,603,610 | 7/1952 | Amos et al. | 252/430 X |
| 2,933,455 | 4/1960 | Doying | 252/430 X |
| 3,004,928 | 10/1961 | Haines et al. | 252/430 |

*Primary Examiner*—Paul F. Shaver
*Attorney, Agent, or Firm*—Bierman and Bierman

[57] ABSTRACT

A catalyst composition which is the reaction product of a monosaccharide, oligosaccharide, polysaccharide or other water soluble polymer containing hydroxyl groups with a permanganate such as potassium permanganate and which has ions other than manganese from periods 4, 5 and/or 6 of the periodic table, boron and/or aluminum incorporated therein. The catalyst is particularly useful for obtaining at least 90 percent oxidation of hydrocarbons.

27 Claims, No Drawings

CATALYST FOR OXIDATION OF HYDROCARBONS AND METHOD OF MAKING SAME

This is a continuation-in-part of application Ser. No. 235388 Filed Mar. 16, 1972 which is a continuation-in-part of application Ser. No. 3190 filed Jan. 15, 1970 and now abandoned.

This application claims priority of British applications Nos.: 2605/69 dated Jan. 16, 1969; 40819/69 dated Aug. 15, 1969; 40820/69 dated Aug. 15, 1969; 60885/69 dated Dec. 13, 1969; 114/70 dated Jan. 1, 1970, and 20924/72 dated May 5, 1972.

This invention concerns compositions derived from the reaction between a permanganate and various organic compounds and a process for the preparation thereof.

The present invention provides a composition which is the reaction product of a monosaccharide, oligosaccharide, polysaccharide or other water soluble polymers containing hydroxyl groups with a permanganate and which has ions other than manganese from periods 4, 5 and/or 6 of the periodic table, boron and/or aluminum incorporated therein.

Preferably the ions to be incorporated are exchanged or adsorbed onto the surface of the composition.

The invention also provides a process for preparing a composition as defined in accordance with the invention, which process comprises adding a solution of a permanganate to a solution of monosaccharide, oligosaccharide or other water soluble polymer containing hydroxyl groups, allowing the reaction mixture to gel or form a precipitate, separating the gel or precipitate from the liquor supernatent thereto and treating the gel or precipitate with a solution containing one or more salts of metals other than manganese in periods 4, 5 and/or 6 of the periodic table and/or a solution containing salts of boron or aluminum.

Preferably the separation of the gel or precipitate from the supernatent liquor is effected by filtration whereafter the gel or precipitate is preferably dried by heating for example at 80°C. The dried gel or precipitate may be washed if desired. An improvement in the catalytic activity of the composition is obtained if the treatment of the gel or precipitate for incorporation of ions other than manganese is carried out in an acidic solution, for example, from 1 to 2 percent sulphuric acid.

Further improvement of the catalytic activity is obtained if, prior to the treatment to incorporate ions other than manganese, the gel or precipitate is treated with ammonia, for example a one percent v/v solution of ammonia (35% $NH_3$). After treatment with ammonia the gel or precipitate is preferably washed and dried before incorporation of ions other than manganese.

The preferred permanganate for use with the invention is potassium permanganate.

As indicated above examples of organic compounds for use in the present invention are lactose, sucrose, dextrin, glucose, starches, pectin, hemicellulose, alginic acid, soluble derivatives of cellulose such as carboxy methyl cellulose, salts such as sodium glutamate, sodium alginate and sodium carboxy methyl cellulose, polyvinyl alcohol and polyethylene glycol.

For example, if two solutions, one containing soluble starch and the other an equal amount of potassium permanganate are mixed, the mixture will solidify to a black gel, the time required being dependent upon the concentration and temperatures of the solutions. This gel may be separated from the clear solution supernatent thereto and dried.

If this procedure is repeated with a starch solution which is less concentrated than the permanganate solution a commensurate loss of strength of the gel is observed until a point is reached where only a gelatinous precipitate composed largely of hydrated manganese dioxide is formed on mixing. This occurs when the starch solution is less than one-fifth as concentrated as the permanganate solution.

All of these compositions when separated from their supernatent liquor, dried, and aftertreated according to the method defined herein produce active catalysts.

The ions other than manganese which are to be incorporated in the gel or precipitate are, as stated boron, aluminium or a member of periods 4, 5 or 6 of the periodic table or mixtures thereof. The salt used to treat the gel or precipitate may contain the ion to be incorporated as a cation as in copper sulphate, silver nitrate, cerium nitrate or lanthanum nitrate or as an anion as in potassium dichromate or sodium borate. Organic salts can be used as well as inorganic salts.

The preferred ions other than manganese to be incorporated are copper, cobalt, nickel, chromium, silver, cerium, lanthanum, iron, zinc, gallium, germanium, molybdenum, osmium, lead, thorium, praseodymium, vanadium, boron, aluminum or mixtures thereof.

Ideally the incorporated ions should be uniformly dispersed over the surface of the gel or precipitate. It is preferred to use solutions containing from 0.1 to 10 percent by weight salt or salts based on the weight of gel or precipitate to be treated the volume of the solution being preferably from one to five times that of the gel or precipitate.

To assist uniformm dispersion the treatment is desirably started at room temperature and preferably the temperature of the solution is subsequently raised to 80°C over a period of 1 hour.

It is preferred that the composition should contain from 10 to 60 percent by weight of manganese and from 0.1 to 5 percent by weight of ions other than manganese.

The composition according to the invention may additionally comprise silica gel or alumina. Compositions comprising silica gel or alumina are conveniently prepared by co-precipitation. For example sodium silicate or an aluminum salt is added to the solution of the organic compound and the pH thereof adjusted during addition of the potassium permanganate.

Alternatively the gel may be held on a support therefor, for example, on silica gel, alumina, pumice, kieselguhr or a ceramic honeycomb. This can be achieved by drying the support by heating to say 100°–150°C cooling in the presence of a dehydrating agent such as phosphorus pentoxide and thereafter adding same to a solution of the organic compound such that at least part of the solution is taken up, a solution of potassium permanganate thereafter being added thereto. Alternatively the dried support is immersed in a liquid containing suspended powdered catalyst and dispersed colloidal alumina, removed, and allowed to drain such that a layer of catalyst and alumina is left adhering to the surface.

In addition the gel may be supported on glass, asbestos, ceramic, metal or carbon fibres by mixing these fibres with the gel in a high speed mixer, filtering and drying. Upon drying the gel acts in such a way as to bind the fibres, forming a porous non-woven structure. Treatment of the supported gel with salt solution is then carred out in accordance with the invention. Alternatively the powdered catalyst suspended in water may be applied to such fibres using for example colloidal alumina as an adhesive.

The catalyst may be pelletised or compressed into a sphere or other solid body with the aid of a binder such as kieselguhr.

The catalyst may be used as an oxidation catalyst and has specific application in for example the purification of exhaust emissions from internal combustion engines, in air purification and treatment of liquid effluent liquors having a high 'biological oxygen demand.'

The invention will be further apparent from the following examples:

EXAMPLE 1

Ninety grams of soluble starch was dissolved in 1 l water to which was added simultaneously the following three solutions:
1. 100 g $KMnO_4$ in 1 l water
2. 50 ml of 50° Tw sodium silicate
3. 20 ml of 15% $H_2SO_4$ Gellation occurred within a few minutes. The gel was aged for 2 hours, after which it was slurried in its supernatent liquor to which was added 70 ml of 20 percent sulphuric acid to neutralise the slurry. It was then filtered, washed lightly and dried. The dry gel was washed thoroughly, first in boiling water followed by repeated washings in hot water.

Fifty grams of the resultant product were treated with 250 ml of 2 percent sulphuric acid containing 0.5 g of copper sulphate and 1.0 g cobalt nitrate for half an hour over which time the temperature was raised to 80°C.

After washing and drying this material was tested for activity by oxidising a series of hydrocarbons over a 7 ml sample supported in a glass reactor using air as the oxidising gas. The temperature at which a 90 percent conversion to carbon dioxide and water was obtained at 8,000 $h^{-1}$ GHSV is recorded in Table 1.

TABLE 1

| Reactant | Concentration (Vol %) | Temp. for 90% Conversion (°C) |
|---|---|---|
| n-pentane | 0.1 | 300 |
| n-hexane | 0.1 | 265 |
| n-heptane | 0.1 | 245 |

EXAMPLE 2

A further 50 g of the product prepared in Example 1 was treated with a 1 percent ammonium hydroxide solution for half an hour over which time the temperature was raised to 80°C. It was then filtered, washed and dried and treated with 250 ml of a 2 percent sulphuric acid solution containing 0.5 g copper sulphate and 0.5 g of chromium sulphate for half an hour over which time the temperature was again raised to 80°C. The catalyst was then washed and dried.

This was tested for activity as in Example 2. The results are shown in Table 2.

TABLE 2

| Reactant | Concentration (Vol %) | Temp. for 90% Conversion (°C) |
|---|---|---|
| n-pentane | 0.1 | 265 |
| n-hexane | 0.1 | 210 |
| n-heptane | 0.1 | 200 |
| cyclohexane | 0.1 | 290 |
| benzene | 0.1 | 300 |

EXAMPLE 3

Thirty grams of soluble starch was dissolved in 300 ml water to which was added simultaneously the following three solutions:
1. 33 g of $KMnO_4$ in 330 ml water
2. 200 ml of 50° Tw sodium silicate
3. 200 ml of 15% $H_2SO_4$ Gellation occurred almost immediately. The gel was aged for 2 hours after which it was slurried in 200 ml of 5 percent sulphuric acid, bringing the pH to 7, filtered, washed lightly and dried. The dry gel was washed thoroughly.

Fifty grams of the gel thus prepared were treated with 250 ml of 2 percent sulphuric acid containing 0.5 g copper sulphate and 1.0 g cobalt nitrate for half an hour over which time the temperature was raised to 80°C. This was then washed and dried.

The activity of this material was tested as in Example 1 (Table 3)

TABLE 3

| Reactant | Concentration (Vol %) | Temp. for 90% Conversion (°C) |
|---|---|---|
| n-pentane | 0.1 | 290 |
| n-hexane | 0.1 | 265 |
| n-heptane | 0.1 | 235 |
| cyclohexane | 0.1 | 300 |
| benzene | 0.1 | 305 |

EXAMPLE 4

300 g of soluble starch and 500 ml of 100° Tw sodium silicate were dissolved in 10 l of water. To this was added a solution containing 1 kg of potassium permanganate and 75 ml of sulphuric acid. The resulting gel was aged for 2 hours then slurried in 5 l of water containing 15 ml sulphuric acid. This was filtered, washed and dried. The dry gel was treated with 1 percent ammonia for 1 hour during which time the temperature was raised to 80°C. The gel was then washed and dried. After drying 100 g of the gel was further treated with a 1 percent sulphuric acid solution containing 1 g of cerous nitrate for 1 hour over which time the temperature was again raised to 80°C. The gel was washed and dried. The activity of this material was tested in the oxidation of heptane as in Example 1. A 90 percent conversion of heptane was obtained at 180°C.

EXAMPLE 5

A sample of the catalyst as prepared in Example 4 was used to treat an industrial effluent solution containing a black sulphur dye. 250 ml of the effluent were aerated in the presence of 50 g of finely ground catalyst for 3 hours. The chemical oxidation demand of the effluent solution was reduced from 400 to 79 ppm and the color reduced from blue black to a clear solution by the treatment.

EXAMPLE 6

3 g of polyvinyl alcohol dissolved in 100 ml water at 50°C was added to 100 ml of a 10 percent potassium permanganate solution also at 50°C. The resulting black gel was aged for 2 hours, filtered, washed and dried and the dried gel was treated with 1 percent ammonia for 1 hour during which time the temperature was raised to 80°C. The gel was then washed and dried. After drying the gel was further treated with a 1 percent sulphuric acid solution containing 0.1 g cerous nitrate for 1 hour over which time the temperature was again raised 80°C. The gel was washed and dried. The activity was tested in the oxidation of heptane as in Example 1. A 90 percent conversion of heptane was obtained at 200°C.

EXAMPLE 7

To 100 ml of an aqueous solution containing 8 g of sucrose was added 100 ml of a 10 percent solution of potassium permanganate. After ageing for two hours the resulting black gel was slurried with water and filtered. After drying 10 g of the gel was treated with 250 ml of a 1 percent sulphuric acid solution containing 0.1 g cerous nitrate for 1 hour during which time the temperature was raised to 80°C. The gel was then washed and again dried.

The activity was tested in the oxidation of heptane as in Example 1 and a 90 percent conversion obtained at 160°C.

EXAMPLE 8

20 g of the gel prepared in Example 1 was treated with a 1 percent solution of sulphuric acid which contained 0.2 g of sodium borate, for 1 hour during which time the temperature was raised to 80°C. The gel was then washed and dried.

The activity was tested in the oxidation of heptane as in Example 1 and a 90 percent conversion obtained at 180°C.

What is claimed is:

1. A composition which is the reaction product of a permanganate with a compound selected from the group consisting of lactose, sucrose, dextrin, glucose, starch, pectin, hemi-cellulose, alginic acid, a salt of alginic acid, a soluble cellulose derivative, a salt of a soluble cellulose derivative, polyvinyl alcohol and polyethylene glycol, said product containing an ion selected from the group consisting of boron, aluminum, chromium, iron, cobalt, nickel, copper, molybdenum, silver, lanthanum, cerium, praseodymium, osmium and mixtures thereof.

2. A composition as claimed in claim 1, wherein the permanganate is potassium permanganate.

3. A composition as claimed in claim 1, wherein the manganese content of the composition is from 10 to 60% by weight.

4. A composition as claimed in claim 3, wherein the content of ions other than manganese that have been incorporated is from 0.1 to 5.0 percent by weight.

5. A composition as claimed in claim 1 and comprising silica gel or a salt of aluminum.

6. A composition as claimed in claim 1 held on a support selected from the group consisting of silica gel, alumina, pumice, kieselguhr, and ceramic honeycomb.

7. A composition as claimed in claim 1, supported on a fibrous support.

8. A composition as claimed in claim 7, wherein the support comprises fibres of glass, asbestos, ceramic, metal or carbon.

9. A process for preparing a catalyst composition, comprising adding a solution of a permanganate to a solution of a compound selected from the group consisting of lactose, sucrose, dextrin, glucose, starch, pectin, alginic acid, a salt of alginic acid, a soluble cellulose derivative, a salt of a soluble cellulose derivative, polyvinyl alcohol and polyethylene glycol, allowing the reaction mixture to gel or form a precipitate, separating the gel or precipitate from the liquor supernatent thereto and treating the gel or precipitate with a solution containing a salt of elements selected from the group consisting of boron, aluminum, chromium, iron, cobalt, nickel, copper, molybdenum, silver, lanthanum, cerium, praseodymium, osmium, and mixtures thereof.

10. A process as claimed in claim 9, wherein the gel or precipitate is treated with ammonia prior to treatment with the salt solution.

11. A process as claimed in claim 9, wherein the gel or precipitate is dried prior to treatment with the salt solution.

12. A process as claimed in claim 1, wherein the treatment of the gel or precipitate with the salt solution is carried out under acidic conditions.

13. A process as claimed in claim 9, wherein the gel or precipitate is treated with a solution which contains from 1 to 5 percent by weight of salt based on the weight of the gel or precipitate.

14. A process as claimed in claim 13, wherein the gel or precipitate is treated with a volume of salt solution which is from 1 to 5 times the volume of the gel or precipitate.

15. A process as claimed in claim 14, wherein the salt solution is a solution of a salt selected from the group consisting of copper sulphate, cobalt nitrate, nickel sulphate, chromium sulphate, silver nitrate, cerium nitrate, lanthanum nitrate, potassium dichromate and mixtures thereof.

16. A process as claimed in claim 15, wherein the salt solution is an aqueous solution.

17. A process as claimed in claim 9, wherein sodium silicate is added to the reaction mixture prior to addition of permanganate solution, and the pH is adjusted to cause silica gel to be co-precipitated with the gel or precipitate.

18. A process as claimed in claim 9, wherein an aluminum salt is added to the reaction mixture prior to addition of permanganate solution, and the pH adjusted if necessary, to cause alumina to be co-precipitated with the gel or precipitate.

19. A process as claimed in claim 9 wherein the solution of a compound is taken up, at least in part, on a support prior to the addition of permanganate solution.

20. A process as claimed in claim 19, wherein the support is a material selected from the group consisting of silica gel, alumina, pumice, kieselguhr and ceramic honeycomb.

21. A process as claimed in claim 19, wherein the support is first heated to from 100° to 150°C and then cooled in the presence of a dehydrating agent.

22. A process as claimed in claim 9, wherein a support is immersed in a liquid containing suspended powdered catalyst composition and dispersed colloidal alumina, to form a layer of catalyst composition and alumina adhering to the support surface.

23. A process as claimed in claim 22, wherein the support is a material selected from the group consisting of silica gel, alumina, pumice, kieselguhr, and ceramic honeycomb.

24. A process as claimed in claim 22, wherein the support is first heated to from 100° to 150°C, and then cooled in the presence of a dehydrating agent.

25. A process as claimed in claim 9, wherein the gel prior to treatment with salt solution is mixed with fibrous material to form a non-woven porous structure.

26. A process as claimed in claim 9, wherein the catalyst composition is suspended in water and mixed with fibrous material and colloidal alumina to adhere the catalyst composition to the fibrous material.

27. A process according to claim 9 wherein sodium silicate is added to the reaction mixture prior to addition of permanganate solution.

* * * * *